United States Patent
Mauerer et al.

(10) Patent No.: US 10,833,352 B2
(45) Date of Patent: Nov. 10, 2020

(54) VEHICLE HAVING A LITHIUM-ION BATTERY

(71) Applicant: Bayerische Motoren Werke Aktiengesellschaft, Munich (DE)

(72) Inventors: Markus Mauerer, Munich (DE); Sebastian Scharner, Tuerkenfeld (DE); Andreas Stoermer, Unterschleissheim (DE); Marcus Hafkemeyer, Frankfurt am Main (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 203 days.

(21) Appl. No.: 14/497,914

(22) Filed: Sep. 26, 2014

(65) Prior Publication Data

US 2015/0010786 A1    Jan. 8, 2015

Related U.S. Application Data

(63) Continuation of application No. PCT/EP2013/056717, filed on Mar. 28, 2013.

(30) Foreign Application Priority Data

Mar. 28, 2012 (DE) .......................... 10 2012 204 962

(51) Int. Cl.
*H01M 10/0525* (2010.01)
*H01M 10/44* (2006.01)
(Continued)

(52) U.S. Cl.
CPC ..... *H01M 10/0525* (2013.01); *H01M 2/1077* (2013.01); *H01M 10/06* (2013.01);
(Continued)

(58) Field of Classification Search
CPC .... H01M 16/00; H01M 10/441; H01M 10/06; H01M 10/0525; H01M 10/052;
(Continued)

(56) References Cited

U.S. PATENT DOCUMENTS 6,844,634 B2 * 1/2005 Kobayashi .............. B60R 16/03
290/40 C
2004/0053083 A1    3/2004 Kobayashi et al.
(Continued)

FOREIGN PATENT DOCUMENTS

CN          1495065 A      5/2004
CN          1864329 A      11/2006
(Continued)

OTHER PUBLICATIONS

Machine translation of DE102009035475 A1, orignally published on Feb. 3, 2011 to Stuis Heiko.*
(Continued)

*Primary Examiner* — Stewart A Fraser
(74) *Attorney, Agent, or Firm* — Crowell & Moring LLP

(57) ABSTRACT

A vehicle includes an electric onboard power system, in which electrical components and at least one lithium-ion battery are integrated. The lithium-ion battery includes a plurality of lithium-ion cells, each lithium-ion cell is based on a cell technology, and the cell technologies of at least two lithium-ion cells are different.

2 Claims, 1 Drawing Sheet

(51) Int. Cl.
*H01M 2/10* (2006.01)
*H01M 10/06* (2006.01)
*H01M 10/052* (2010.01)
*B60L 58/20* (2019.01)

(52) U.S. Cl.
CPC ........... *H01M 10/441* (2013.01); *B60L 58/20* (2019.02); *H01M 10/052* (2013.01); *H01M 2220/20* (2013.01); *Y02E 60/122* (2013.01); *Y02T 10/7066* (2013.01)

(58) Field of Classification Search
CPC ............. H01M 10/24; H01M 10/4207; H01M 2220/20; H01G 11/06; Y02E 60/13; Y02E 60/122; Y02T 10/7011; Y02T 10/7022; Y02T 10/7066; Y02T 10/7005; Y02T 10/7016; Y02T 10/7055; Y02T 10/7061; B60L 58/20
USPC .......................................................... 429/9
See application file for complete search history.

(56) References Cited

U.S. PATENT DOCUMENTS

| | | | |
|---|---|---|---|
| 2004/0201365 A1 | 10/2004 | Dasgupta et al. | |
| 2007/0029124 A1 | 2/2007 | DasGupta et al. | |
| 2010/0116570 A1* | 5/2010 | Sugawara | B60K 1/04 180/65.1 |
| 2011/0086248 A1 | 4/2011 | Nakura | |
| 2011/0206950 A1* | 8/2011 | Doege | H01M 6/42 429/9 |
| 2011/0241900 A1 | 10/2011 | Nicollier et al. | |
| 2013/0089761 A1* | 4/2013 | Schiemann | H01M 2/0242 429/61 |

FOREIGN PATENT DOCUMENTS

| | | |
|---|---|---|
| CN | 102027617 A | 4/2011 |
| DE | 10 2007 041 526 A1 | 2/2009 |
| DE | 10 2009 035 475 A1 | 2/2011 |
| DE | 10 2009 029 268 A1 | 3/2011 |
| DE | 10 2009 029 335 A1 | 3/2011 |
| EP | 1 222 708 A1 | 7/2002 |
| EP | 1 401 082 A2 | 3/2004 |
| EP | 2 169 760 A1 | 3/2010 |
| EP | 2 190 101 A1 | 5/2010 |
| WO | WO 01/24303 A1 | 4/2001 |
| WO | WO 2011157618 A1 * 12/2011 .......... H01M 2/0242 |  |

OTHER PUBLICATIONS

Machine Translation of Fink Holger et al. (DE 102009029268 A1) "Lithium-Akkumulatorsystem insbesondere für den Einsatz in einem Standard 14V-Bordnetz" pp. 1-13, 2010. (Year: 2010).*
Chinese-language Office Action issued in counterpart Chinese Application No. 201380023817.4 dated Jan. 14, 2016 with English translation (Twelve (12) pages).
International Search Report (PCT/ISA/210) dated Jun. 28, 2013, with English translation (Seven (7) pages).
German Search Report dated Dec. 5, 2012, with English translation (Ten (10) pages).
Chinese-language Office Action issued in counterpart Chinese Application No. 201380023817.4 dated Mar. 20, 2017 with English translation (Eleven (11) pages).

* cited by examiner

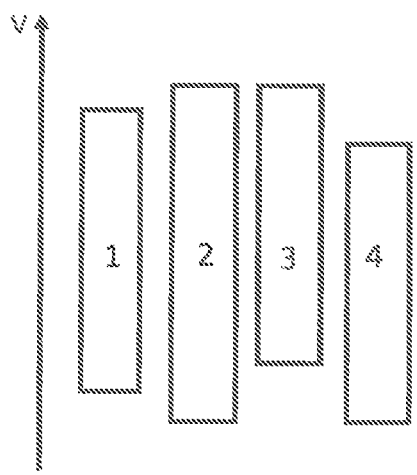

VEHICLE HAVING A LITHIUM-ION BATTERY

CROSS REFERENCE TO RELATED APPLICATIONS

This application is a continuation of PCT International Application No. PCT/EP2013/056717, filed Mar. 28, 2013, which claims priority under 35 U.S.C. § 119 from German Patent Application No. 10 2012 204 962.2, filed Mar. 28, 2012, the entire disclosures of which are herein expressly incorporated by reference.

BACKGROUND AND SUMMARY OF THE INVENTION

The invention relates to a vehicle having an electrical onboard power system, in which electrical components and at least one lithium-ion battery are integrated.

Due to the energy density and power density of electrochemical lithium-ion systems, lithium-ion batteries are suitable for use in onboard vehicle power systems.

According to the state of the art, such as EP 1 222 708 A1, modern lithium-ion batteries are composed of a plurality of lithium-ion cells.

Lithium-ion cells are used for this purpose, which may have different geometric designs. One example are pouch cells, as described in EP 1 222 708 A1.

It is an object of the present invention to provide an improved vehicle having an electrical onboard power system, in which electrical components and at least one lithium-ion battery are integrated.

This and other objects are achieved by a vehicle having an electrical onboard power system, in which electrical components and at least one lithium-ion battery are integrated. The lithium-ion battery comprises a plurality of lithium-ion cells. Each lithium-ion cell is based on a cell technology, and the cell technologies of at least two lithium-ion cells are different.

According to the invention, the lithium-ion battery comprises multiple lithium-ion cells, each lithium-ion cell being based on a cell technology, wherein the cell technologies of at least two lithium-ion cells are different.

The "cell technology" of a lithium-ion cell is based on a particular electrochemical system. Common electrochemical systems for lithium-ion cells that each constitute a cell technology and include the $Li/Li^+$ redox couple of the electrochemical series are, for example, lithium iron phosphate technology, lithium titanate technology, and lithium nickel manganese cobalt oxide technology.

In other words, the invention encompasses a battery comprising cells that differ from each other in terms of the cell technology of the same.

According to a preferred embodiment of the invention, a first selection of electrical components in the vehicle can essentially be supplied with electric power by the lithium-ion battery, wherein this first selection of electrical components is characterized by a first typical voltage operating range between a first upper voltage limit value and a first lower voltage limit value, and according to this embodiment the lithium-ion battery can essentially be supplied with electric power by a second selection of electrical components, wherein the second selection is characterized by a second typical voltage operating range between a second upper voltage limit value and a second lower voltage limit value.

This means that the lithium-ion battery in the vehicle supplies a particular group of electrical components of the onboard vehicle power system with electric power and energy as a power and energy source when operated as intended. This group of electrical components is referred to as consumers or loads. In corresponding fashion, as a secondary energy store, the lithium-ion battery can assume the function of an energy and power sink. When operated as intended, the lithium-ion battery is supplied with electric power by a particular group of electrical components of the onboard vehicle power system. This group of electrical components is referred to as generators.

The consumers and the generators each have a typical voltage operating range when operated as intended.

In addition, it is advantageous if a battery voltage operating range between an upper battery limit value and a lower battery limit value is provided. The upper battery limit value is provided by the larger value of the two upper voltage limit values. The lower battery limit value is provided by the smaller value of the two lower voltage limit values, and the lithium-ion battery is characterized by a typical battery voltage range.

This is equivalent to the battery voltage operating range, with respect to the voltage parameter, being provided as a set union of the typical voltage operating range of the consumers and the typical voltage operating range of the generators.

Moreover, the lithium-ion battery is characterized by a battery voltage range, which essentially describes the dependency of the open-circuit voltage of the battery as a function of the charge state of the battery.

According to a particularly preferred embodiment of the invention, the battery voltage range corresponds to the battery voltage operating range or the battery voltage range includes the battery voltage operating range.

The onboard vehicle power system according to the invention has particular advantages. The full battery capacity in the vehicle can be used by setting the battery voltage range to the battery voltage operating range. It is therefore not necessary to oversize the battery so as to render a predefined amount of energy usable. Moreover, setting the battery voltage range allows the battery to be operated in a predefinable average charge state. This range can be predefined in such limits that the operation of the battery is carried out in a way that benefits the battery service life in comparison with other average charge states.

It is advantageous if the battery voltage range can be set by the respective number of lithium-ion cells having at least two different cell technologies.

The condition where the battery voltage range corresponds to the battery voltage operating range, or the battery voltage range includes the battery voltage operating range, can be achieved by providing a lithium-ion battery formed by a plurality of lithium-ion cells, which can comprise a different cell technology for each cell. A charge-state-dependent open-circuit voltage characteristic curve of the lithium-ion battery can thus be implemented, which at the extrema thereof at a charge state of 0% and a charge state of 100% is virtually congruent with the battery voltage operating range or comprises the same. Additionally, an operating strategy of the lithium-ion battery can provide that the battery voltage range can preferably be used between voltage limits that correspond to predefinable charge states, for example between a charge state of 20% and a charge state of 90%. A temporal minimization of extreme charge states generally maximizes the service life of a lithium-ion battery.

According to a further variant of the invention, a lead acid battery is moreover integrated into the onboard vehicle power system. The lithium-ion battery is connected in parallel to the lead acid battery.

For example, this allows for both the specific advantages of a lead acid battery as the energy store and the specific advantages of the lithium-ion battery as the energy store to be utilized in the onboard power system. This is possible when the lithium-ion battery is utilized as a short-term store with a high degree of cyclization, and the lead acid battery is used as a long-term store with a low degree of cyclization.

The invention is based on the considerations described hereafter.

An additional lithium-ion store is used simultaneously with a 12-volt lead acid battery. The utilization of the available storage content of the lithium-ion battery based on the voltage condition thereof is improved by using lithium-ion cells having differing lithium-ion cell chemistries ("cell technology") within the lithium-ion battery so as to be able to adapt the voltage condition of the lithium-ion store more precisely to the needs in the onboard power system. The lithium-ion store can then be ideally utilized in terms of power and capacity.

Other objects, advantages and novel features of the present invention will become apparent from the following detailed description of one or more preferred embodiments when considered in conjunction with the accompanying drawing.

BRIEF DESCRIPTION OF THE DRAWING

FIG. 1 is a diagram showing a battery voltage range and a battery voltage operating range.

DETAILED DESCRIPTION OF THE DRAWING

A plurality of electric consumers is integrated into the physical onboard power supply system of a vehicle having a rated voltage of 14 volts. These range from safety systems such as the lighting system or electric suspension control systems, to control units of the onboard data network, to comfort consumers such as heated seats.

The physical onboard power system moreover comprises an electric generator as an energy source. Without limiting the general nature, this is typically a claw pole generator. A further generator could be, for example, a thermoelectric generator. Energy converters also assume the function of a generator in the onboard power system. A solar roof is one such example.

Proceeding from the rated voltage condition of the onboard power system of 14 volts, the consumers and generators are operated in each case in a typical voltage range. For example, certain control units in the automotive industry are typical specified in a typical voltage range of 9 to 16 volts.

The typical voltage range of the power output of a claw pole generator, implemented by a generator controller, is in the range of 10.6 to 15.5 volts.

The ideal voltage-related operating range of an electric energy store that is integrated into the onboard power system has a particular relationship with the typical voltage range of the consumers and of the generators, wherein the operating range of the energy store is given by the open-circuit voltage thereof as a function of the charge state thereof and within a voltage range predefined by the cell technologies. According to FIG. 1, the voltage-related operating range of the energy store 2 preferably completely subsumes or includes the voltage-based onboard power system operating range 1 of the consumers and/or generators and is 9 to 16 volts, for example. According to further embodiments, the voltage-related operating range of the energy store overlaps the voltage-based onboard power system operating range at least partially, and goes beyond the same toward higher voltages 3 or toward lower voltages 4.

In the case of the partial overlap toward a higher voltage 3, the specific advantage arises that a virtually completely discharged energy store has a voltage that is still within the onboard power system operating range 1. In this way, even an almost completely discharged energy store can contribute to a voltage-related voltage stabilization of the onboard power system. In addition, an energy store having the configuration 3 of FIG. 1 does not have to be protected from overcharging since the energy store is in a partially discharged state at the voltage-related upper limit of the onboard power system operating range.

The electrochemical potential of a lead acid battery cell is given by the redox couple of $Pb/PbSO_4$ at approximately 2 volts per charged cell. A charged 6-cell lead acid battery thus has a rated voltage of approximately 12 volts.

With a voltage range between 10.5 volts at a charge state of 0% and approximately 12.8 volts at a charge state of 100%, a modern lead acid battery in AGM technology consequently covers the onboard power system operating range quite well.

In a lithium-ion battery, cells having differing cell technologies can be used in the case of a multi-cell battery system. Common cell technologies of the $Li/Li^+$ redox couple are, for example, lithium iron phosphate technology ($LiFePO_4$), lithium titanate technology ($Li_4Ti_5O_{12}$), and lithium nickel manganese cobalt oxide technology ($LiNi_{0.33}Co_{0.33}Mn_{0.33}O_2$). By way of example, this means that, with the lithium iron phosphate technology, the active material of the positive electrode of the lithium-ion cell is formed by $LiFePO_4$, and, in the lithium nickel manganese cobalt oxide technology, it is formed by $LiNi_{0.33}Co_{0.33}Mn_{0.33}O_2$. The negative electrode of the cell is composed of the active material graphite in each case, which acts as a host lattice for the $Li^+$ ions. Depending on the positive active material that is used in the cell, the cell has a characteristic voltage curve between a charge state of 0% and a charge state of 100%. This is 2.0 volts to 3.6 volts for lithium iron phosphate technology, 1.5 volts to 2.8 volts for lithium titanate technology, and 2.0 volts to 4.2 volts for lithium nickel manganese cobalt oxide technology.

While lithium-ion batteries according to the related art—such as the lead acid battery, for example—comprise only cells of one cell technology, the exemplary embodiment of the invention describes a battery comprising cells having different cell technologies.

If a battery is composed of four cells of lithium titanate technology and one cell of lithium nickel manganese cobalt oxide technology, an operating range between 8 volts and 14.8 volts results for the battery. The advantage of this is that this operating range is very similar to that of a lead acid battery in ACM technology. As a result, simplified parallel connection is possible.

As an alternative, the lithium-ion cell can be composed of three cells of lithium iron phosphate and two cells of lithium titanate. This results in an operating range between 9 volts and 16.4 volts for the battery. This is optimal because the entire voltage range of the 14-volt onboard power system can be utilized.

The exemplary embodiments provide a fundamental technical advantage.

In terms of the voltage-related operating range, the lithium-ion battery can be adapted to the requirements posed by the onboard power system. This can be referred to as "voltage engineering." The design of the onboard vehicle power system is therefore considerably more flexible. Since the electrochemical system of the lead acid battery establishes a voltage operating range of the battery, this created a boundary condition in terms of the design of the onboard power system in vehicle development until now. The operating ranges of the generators and consumers had to be adapted to the predefined operating range of the battery.

A lithium-ion battery having differing cell technologies makes a reverse approach possible: a design of the onboard power system without boundary conditions presented by the battery follows the design of the lithium-ion battery in a second step.

For the design of onboard vehicle power system in the future, this means that the size and weight of a lithium-ion battery can be minimized due to the optimal adaptability to the onboard energy system. This can be done despite the use of standardized and established 14-volt components in the onboard power system, and thus also optimizes system costs.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:
1. A vehicle, comprising:
an electrical onboard power system;
electrical components integrated in the electrical onboard power system;
at least one lithium-ion battery integrated in the electrical onboard power system, wherein
the lithium-ion battery comprises a plurality of lithium-ion cells, each lithium-ion cell being based on a particular cell technology, the cell technologies of at least two of the plurality of lithium-ion cells being different, and the at least two cells having different cell technologies being directly connected in series within the lithium-ion battery,
in the electrical onboard power system of the vehicle, a first selection of the electrical components are supplied with electric power by the lithium-ion battery, the first selection being characterized by a first typical voltage operating range between a first upper voltage limit value of 14.8 volts and a first lower voltage limit value of 9 volts;
a second selection of electrical components supply electric power to the lithium-ion battery, the second selection being characterized by a second typical voltage operating range between a second upper voltage limit value of 15.5 volts and a second lower voltage limit value of 10.6 volts,
a respective number of the lithium-ion cells having the at least two different cell technologies connected in series in the at least one lithium-ion battery provides a battery voltage operating range between an upper battery limit value that is between 14.8 and 16.4 volts and a lower battery limit value that is between 8 and 9 volts.

2. The vehicle according to the claim 1, further comprising:
a lead acid battery integrated into the vehicle, wherein the lithium-ion battery is connected in parallel to the lead acid battery.

* * * * *